(12) United States Patent
Sugihara

(10) Patent No.: US 11,441,475 B2
(45) Date of Patent: Sep. 13, 2022

(54) COOLING SYSTEM

(71) Applicant: TOYOTA JIDOSHA KABUSHIKI KAISHA, Aichi-ken (JP)

(72) Inventor: Hiroyuki Sugihara, Shizuoka-ken (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 22 days.

(21) Appl. No.: 17/179,412

(22) Filed: Feb. 19, 2021

(65) Prior Publication Data

US 2021/0332740 A1    Oct. 28, 2021

(30) Foreign Application Priority Data

Apr. 22, 2020 (JP) .............................. JP2020-076014

(51) Int. Cl.
| | |
|---|---|
| *B60K 11/04* | (2006.01) |
| *F01P 7/10* | (2006.01) |
| *B60K 6/26* | (2007.10) |
| *F01P 3/18* | (2006.01) |
| *F01P 3/20* | (2006.01) |
| *B60K 6/24* | (2007.10) |

(52) U.S. Cl.
CPC ........ *F01P 7/10* (2013.01); *B60K 6/24* (2013.01); *B60K 6/26* (2013.01); *F01P 3/18* (2013.01); *F01P 3/20* (2013.01); *F01P 2003/182* (2013.01)

(58) Field of Classification Search
CPC ....... B60K 11/085; B60K 11/04; B60K 11/06; B60K 11/08; B60K 2001/003; B60K 6/44; Y02T 10/12; Y02T 10/62; F01P 2050/24

See application file for complete search history.

(56) References Cited

U.S. PATENT DOCUMENTS

| | | | | |
|---|---|---|---|---|
| 2010/0147611 | A1* | 6/2010 | Amano | F01P 7/12 180/68.1 |
| 2011/0062750 | A1* | 3/2011 | Nakaura | B60R 19/12 296/187.09 |
| 2016/0368366 | A1* | 12/2016 | Miller | B60K 11/085 |
| 2018/0162401 | A1* | 6/2018 | Yamazaki | F02D 11/105 |
| 2018/0361846 | A1* | 12/2018 | Dudar | B60K 11/085 |
| 2019/0031199 | A1* | 1/2019 | Dudar | B60K 11/085 |

FOREIGN PATENT DOCUMENTS

| | | | | |
|---|---|---|---|---|
| CN | 109906161 A | * | 6/2019 | ........ B60H 1/00028 |
| JP | 201713638 A | | 1/2017 | |
| WO | WO-2017060582 A1 | * | 4/2017 | ............. B60K 11/04 |

* cited by examiner

*Primary Examiner* — George C Jin
*Assistant Examiner* — Teuta B Holbrook
(74) *Attorney, Agent, or Firm* — Hauptman Ham, LLP

(57) ABSTRACT

A cooling system of a hybrid vehicle includes a radiator, an openable and closable first shutter, an openable and closable second shutter, and a control device. The radiator is placed forward of an internal combustion engine and a heat generation device configured to generate heat along with operation of the drive motor, and the radiator communicates with the heat generation device and the internal combustion engine such that a coolant circulates through the internal combustion engine and the heat generation device. The first shutter extends from a front end of an undercover so as to cross between the radiator, and the heat generation device and the internal combustion engine. The second shutter extends between a front end part of the undercover and a lower part of the radiator. The control device controls opening and closing of the first shutter and the second shutter.

7 Claims, 9 Drawing Sheets

COOLING SYSTEM

CROSS-REFERENCE TO RELATED APPLICATION

This application claims priority to Japanese Patent Application No. 2020-076014 filed on Apr. 22, 2020, incorporated herein by reference in its entirety.

BACKGROUND

1. Technical Field

This disclosure relates to a cooling system.

2. Description of Related Art

In the related art, there has been proposed a cooling system in which an openable and closable shutter is provided between a radiator and an internal combustion engine (e.g., Japanese Unexamined Patent Application Publication No. 2017-013638 (JP 2017-013638 A)). In the cooling system described in JP 2017-013638 A, an openable and closable shutter is also provided in an outlet of an engine compartment, so that early warming-up at a cold start of the internal combustion engine is balanced with cooling when the internal combustion engine is at high temperature.

SUMMARY

In the meantime, many hybrid vehicles are configured such that an internal combustion engine and a drive motor are provided in an engine compartment. In the hybrid vehicles, a heat generation device that generates heat along with operation of the drive motor requires a temperature control as well as the internal combustion engine. However, depending on operation states of the hybrid vehicles, the internal combustion engine and the drive motor have different requests for the temperature control. Accordingly, even if the shutter described in JP 2017-013638 A is provided between the radiator, and the internal combustion engine and the heat generation device for the drive motor, respective temperature controls on the internal combustion engine and the heat generation device cannot be necessarily performed appropriately.

In view of the above problem, an object of this disclosure is to provide a cooling system that can appropriately perform respective temperature controls on an internal combustion engine and a heat generation device for a drive motor in a hybrid vehicle.

The summary of this disclosure is as follows.

(1) A cooling system according to one aspect of this disclosure is a cooling system for a hybrid vehicle driven by an internal combustion engine and a drive motor. The cooling system includes a radiator, a first shutter, a second shutter, and a control device. The radiator is placed forward of the internal combustion engine and a heat generation device configured to generate heat along with operation of the drive motor, the radiator communicating with the heat generation device and the internal combustion engine such that a coolant circulates through the internal combustion engine and the heat generation device. The first shutter is provided in an openable and closable manner such that the first shutter extends from a front end or a top face of an undercover so as to cross between the radiator, and the heat generation device and the internal combustion engine. The undercover is provided below the internal combustion engine and the heat generation device. The undercover is configured to partially cover a bottom face of the hybrid vehicle. The second shutter is provided in an openable and closable manner such that the second shutter extends between a front end part of the undercover and a lower part of the radiator. The control device is configured to control opening and closing of the first shutter and the second shutter.

(2) In the cooling system described in (1), the radiator may include a first radiator communicating with the internal combustion engine, and a second radiator communicating with the heat generation device.

(3) In the cooling system described in (2), the second radiator may be formed separately from the first radiator and may be at least partially placed downward from the first radiator.

(4) In the cooling system described in any one of (1) to (3), when the hybrid vehicle is driven by the drive motor without being driven by the internal combustion engine, the control device may close the first shutter and open the second shutter.

(5) In the cooling system described in any one of (1) to (4), when the hybrid vehicle is driven by the internal combustion engine, the control device may open the first shutter.

(6) In the cooling system described in (5), even in a case where the hybrid vehicle is driven by the internal combustion engine, when the internal combustion engine is during warming-up, the control device may close the first shutter.

(7) In the cooling system described in (5) or (6), when traveling noise of the hybrid vehicle is a predetermined value or less or is expected to become the predetermined value or less, or when a temperature of an exhaust pipe of the internal combustion engine is a predetermined temperature or more or is expected to become the predetermined temperature or more, the control device may close the second shutter.

With this disclosure, a cooling system that can appropriately perform respective temperature controls on an internal combustion engine and a heat generation device for a drive motor in a hybrid vehicle is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

With reference to the drawings, the following describes an embodiment of the present disclosure in detail. Note that, in the following description, the same constituents have the same reference sign.

Configuration of Vehicle

Figure 1:
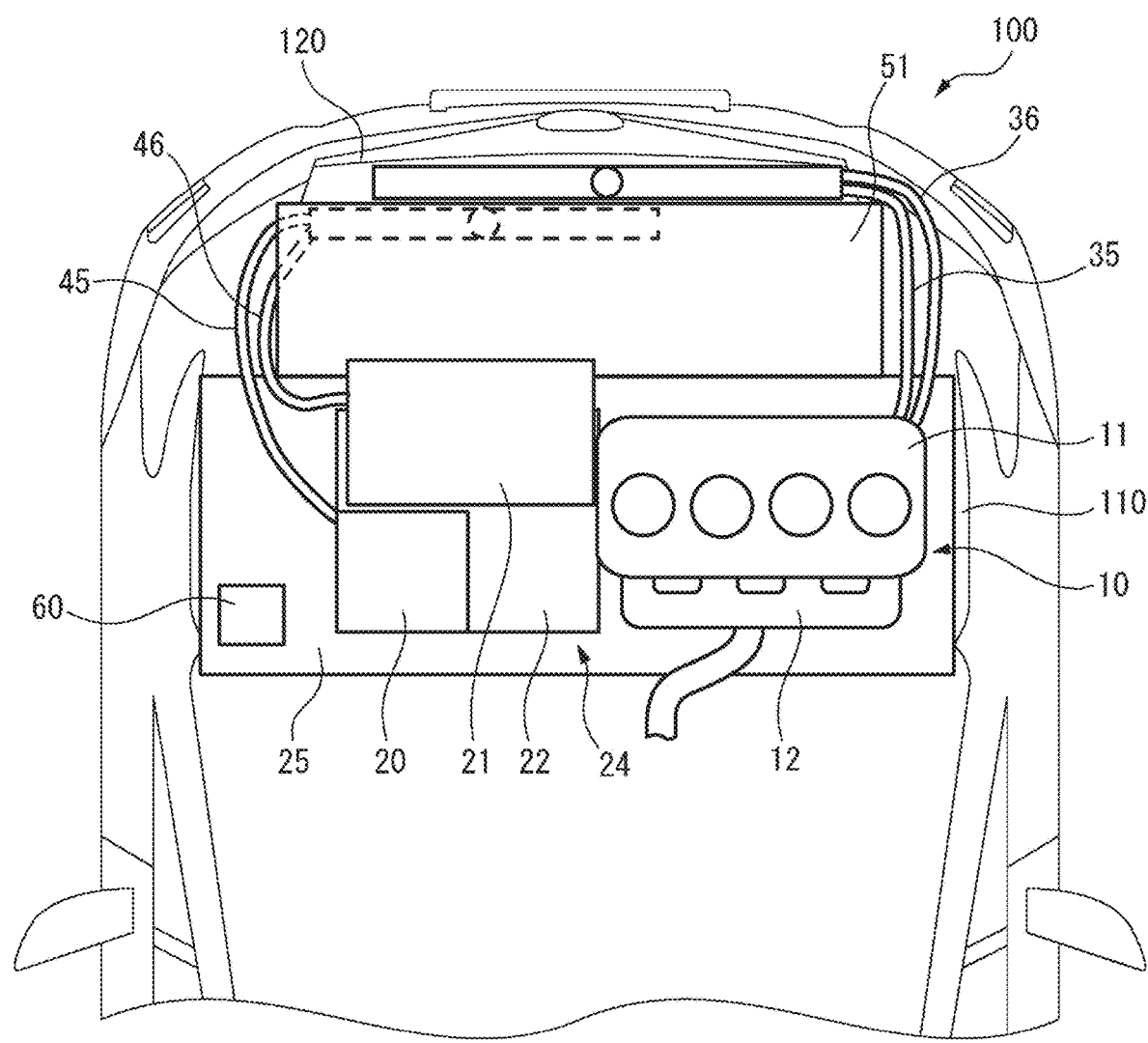
FIG. 1 is a schematic plan view illustrating a configuration of a cooling system and so on inside a compartment placed in a front part of a vehicle.
Figure 2:
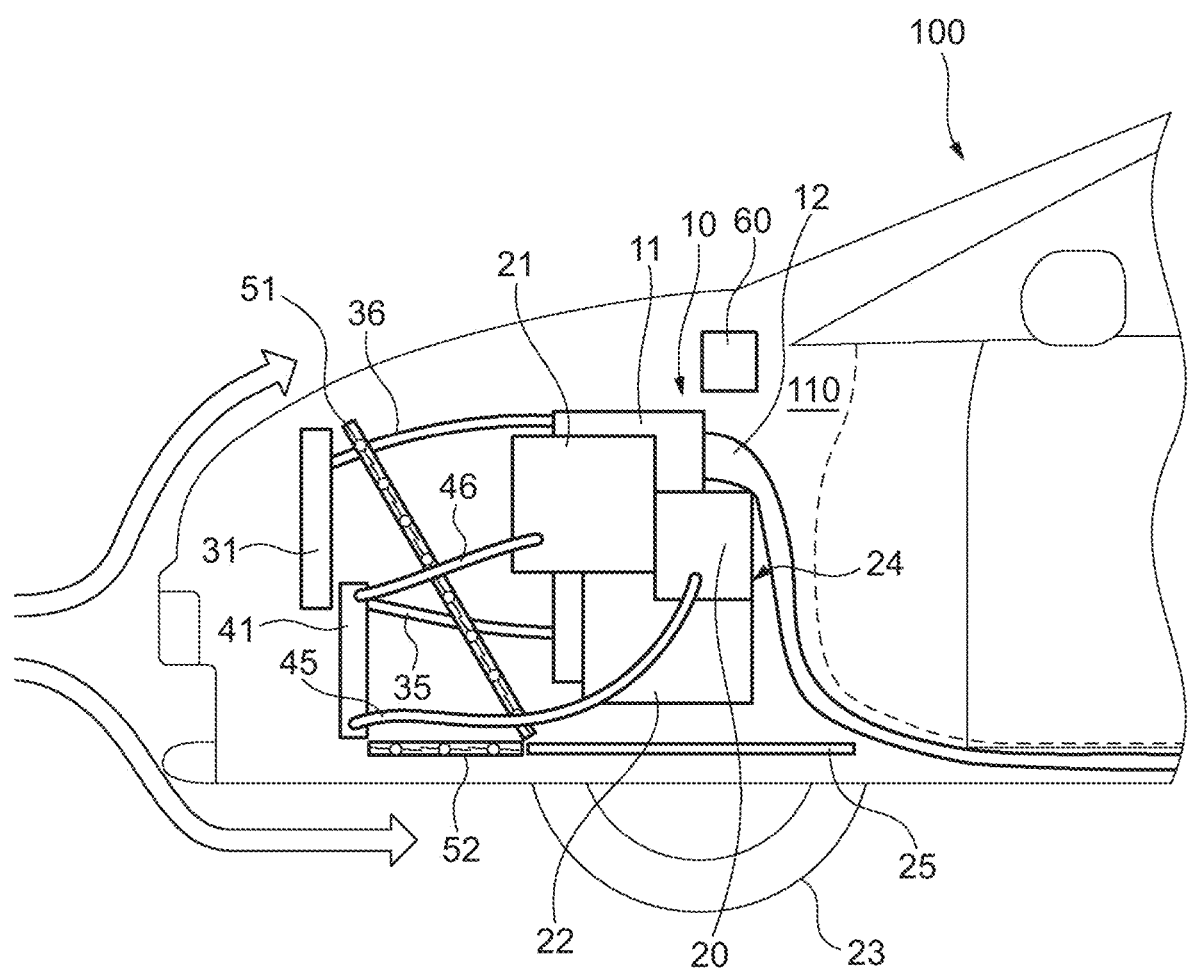
FIG. 2 is a schematic side view illustrating the configuration of the cooling system and so on inside the compartment.

With reference to FIGS. 1, 2, the following describes configurations of a cooling system according to the present embodiment and a vehicle 100 in which the cooling system is provided. FIG. 1 is a schematic plan view illustrating the configuration of the cooling system and so on inside a compartment 110 placed in a front part of the vehicle 100. FIG. 2 is a schematic side view illustrating the configuration of the cooling system and so on inside the compartment 110. In FIGS. 1, 2, a body of the vehicle 100 is illustrated by a thin line so that the outer shape of the vehicle 100 is clear.

The vehicle 100 according to the present embodiment is a hybrid vehicle. Accordingly, the vehicle 100 includes an internal combustion engine 10, a drive motor 20, a power control unit (PCU) 21 configured to control the drive motor 20, and a transaxle 22, and the vehicle 100 is driven by the internal combustion engine 10 and the drive motor 20. In the present embodiment, the drive motor 20, the PCU 21, and the transaxle 22 are formed as an integrated drive assembly 24. Further, the vehicle 100 includes an undercover 25 configured to cover a bottom face of the compartment 110.

The internal combustion engine 10 is a motor configured to burn fuel such as gasoline or light oil inside the engine so as to convert heat energy of combustion gas into mechanical energy. The output of the internal combustion engine 10 is controlled by adjusting the amount of fuel or air to be supplied to the internal combustion engine 10. An output shaft (crankshaft) of the internal combustion engine 10 is mechanically connected to the transaxle 22, and power generated by the internal combustion engine 10 is input into the transaxle 22.

The internal combustion engine 10 includes an engine proper 11 and an exhaust pipe (including an exhaust system component inside the compartment 110, e.g., a catalytic converter and the like) 12 connected to the engine proper 11. Combustion of the fuel is performed in the engine proper 11, and the exhaust pipe 12 is used to discharge exhaust gas generated by the combustion from the engine proper 11. Accordingly, the exhaust gas at high temperature flows through the exhaust pipe 12.

The drive motor 20 is an electric machine configured to electrically generate driving force when electric power is supplied to the drive motor 20. The drive motor 20 may be a motor generator also functioning as a generator configured to generate regenerative electric power by converting rotational force to electric power. The drive motor 20 is electrically connected to the PCU 21 and is mechanically connected to the transaxle 22. The drive motor 20 generates driving force based on electric power supplied from the PCU 21, and the driving force thus generated is input into the transaxle 22. Note that, in the present embodiment, the vehicle 100 is provided with one drive motor 20 but may be provided with a plurality of drive motors (motor generators).

The PCU 21 is a device configured to supply electric power to the drive motor 20 and control the drive motor 20. The PCU 21 includes, for example, an inverter, a boost converter, and a DC-DC converter. The inverter, the boost converter, and the DC-DC converter are heat generation devices that generate heat along with their operations. Accordingly, the PCU 21 includes the heat generation devices that generate heat along with the operation of the drive motor 20.

The PCU 21 is electrically connected to the drive motor 20 and is also electrically connected to a battery (not shown). When the PCU 21 drives the drive motor 20, the PCU 21 supplies electric power to the drive motor 20 upon receipt of the electric power from the battery and controls the electric power to be supplied to the drive motor 20 in accordance with necessary driving force.

The transaxle 22 is a power transmission mechanism configured to transmit power from the internal combustion engine 10 and the drive motor 20 to driving wheels 23 and vice versa. The transaxle 22 includes, for example, a power split mechanism configured to split power from the internal combustion engine 10 and the drive motor 20 to the driving wheels 23 and vice versa, and a motor deceleration mechanism configured to decelerate the drive motor. The transaxle 22 transmits, to the driving wheels 23, driving force generated by the internal combustion engine 10 or the drive motor 20. Further, in a case where a motor generator is used as the drive motor 20, the transaxle 22 transmits power from the driving wheels 23 to the drive motor 20 at the time of regeneration.

The undercover 25 is a cover configured to partially cover the bottom face of the vehicle 100, particularly, the lower side of the compartment 110. The undercover 25 is provided below the engine proper 11 and the drive assembly 24 and restrains foreign matter (pebbles or water) on a road surface from entering the engine proper 11, the drive motor 20, the PCU 21, and the transaxle 22. Further, the undercover 25 is used to adjust the flow of wind flowing below the vehicle 100 so as to reduce air resistance to the vehicle 100.

Configuration of Cooling System

Figure 3A:
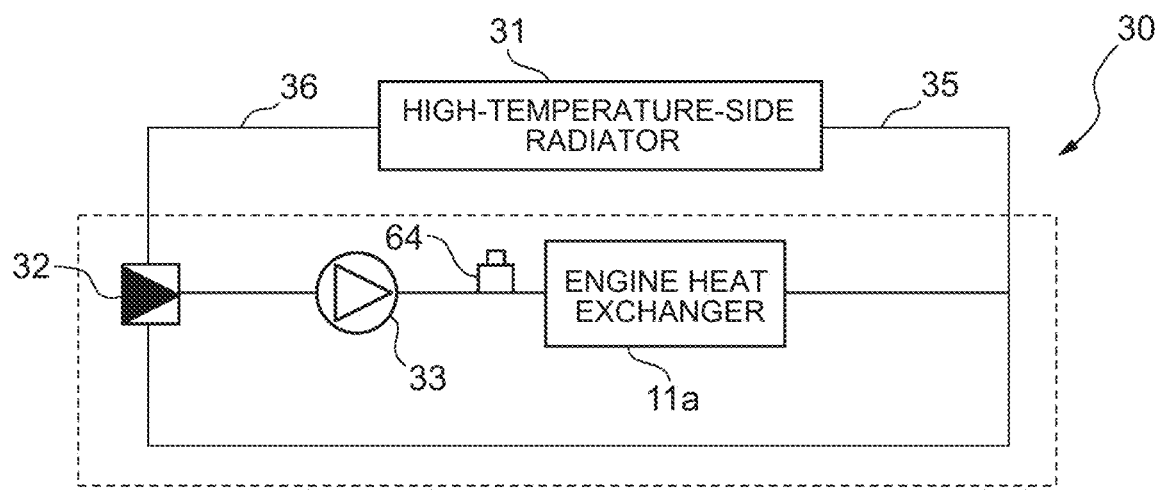
FIG. 3A is a view schematically illustrating one of two cooling circuits included in the cooling system.
Figure 3B:
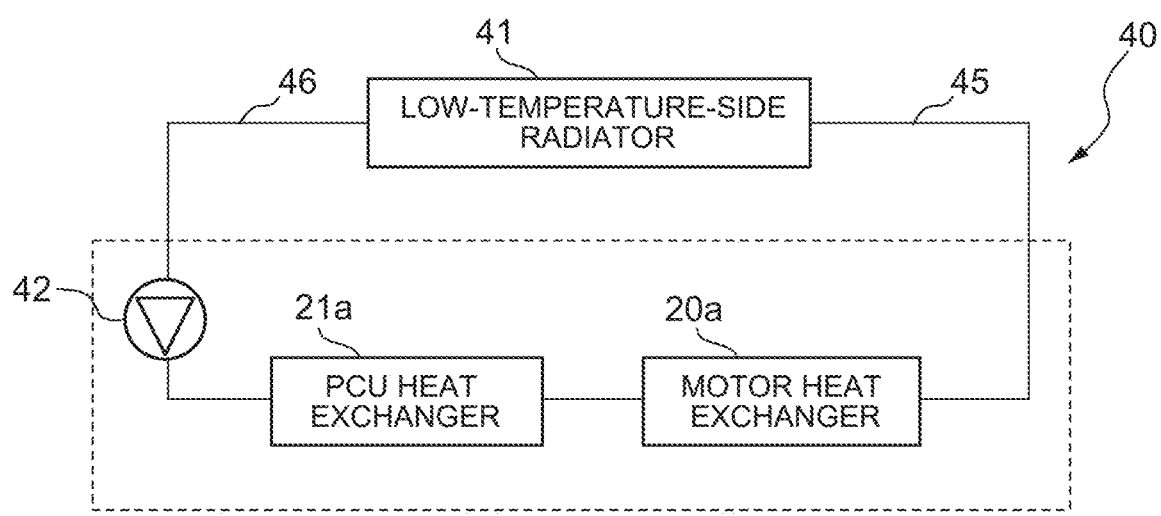
FIG. 3B is a view schematically illustrating the other one of the two cooling circuits included in the cooling system.

With reference to FIGS. 1 to 3A, 3B, the following describes a configuration of the cooling system according to the present embodiment. FIGS. 3A, 3B are views schematically illustrating two cooling circuits included in the cooling system.

The cooling system includes two cooling circuits, i.e., a high-temperature circuit 30 used for cooling the internal combustion engine 10, and a low-temperature circuit 40 configured to cool the heat generation devices that generate heat along with the operation of the drive motor. As illustrated in FIG. 3A, the high-temperature circuit 30 includes a high-temperature-side radiator (a first radiator) 31, a thermostat 32, a high-temperature-side pump 33, and an engine heat exchanger 11a provided in the engine proper 11. In the high-temperature circuit 30, these constituents communicate with each other so that a cooling medium (a coolant in the present embodiment) circulates through the constituents.

Further, the thermostat 32, the high-temperature-side pump 33, and the engine heat exchanger 11a of the high-temperature circuit 30 are provided in the engine proper 11 (a broken line indicates a part provided in the engine proper 11). Accordingly, the high-temperature circuit 30 includes high-temperature-side pipes 35, 36 communicating with the high-temperature-side radiator 31 and the engine proper 11 so that the coolant flows between the high-temperature-side radiator 31 and the engine proper 11. In the present embodiment, the high-temperature circuit 30 includes two pipes, i.e., a first high-temperature-side pipe 35 and a second high-temperature-side pipe 36. A coolant outlet of the engine proper 11 communicates with a coolant inlet of the high-temperature-side radiator 31 via the first high-temperature-side pipe 35. A coolant outlet of the high-temperature-side radiator 31 communicates with a coolant inlet of the engine proper 11 via the second high-temperature-side pipe 36.

The high-temperature-side radiator 31 is placed in a front part of the compartment 110. Accordingly, the high-temperature-side radiator 31 is placed forward of the internal combustion engine 10, the drive motor 20, the PCU 21, and the transaxle 22. Particularly, in the present embodiment, the high-temperature-side radiator 31 is placed right behind a front grille 120 of the vehicle 100.

The high-temperature-side radiator 31 includes a plurality of coolant passages provided in parallel to each other, and many fins provided between the coolant passages. The high-temperature-side radiator 31 is configured such that, when the coolant at high temperature flows through the coolant passages, the coolant is cooled by wind flowing through the high-temperature-side radiator 31.

The thermostat 32 is a valve configured to open and close a passage to the high-temperature-side radiator 31. When the temperature of the coolant is high, the valve is opened to introduce the coolant into the high-temperature-side radiator 31 so that the temperature of the coolant is decreased, and when the temperature of the coolant is low, the valve is closed to stop introducing the coolant into the high-temperature-side radiator so that the temperature of the coolant is promoted to increase.

The high-temperature-side pump 33 pumps the coolant circulating through the high-temperature circuit 30. In the present embodiment, the high-temperature-side pump 33 is an electrically-driven water pump and is configured such that its discharge capacity is changed continuously by adjusting electric power to be supplied to the high-temperature-side pump 33.

The engine heat exchanger 11a is a heat exchanger configured to exchange heat between the coolant in the high-temperature circuit 30 and the engine proper 11. The engine heat exchanger 11a is formed as a passage for the coolant inside the engine proper 11. The engine heat exchanger 11a transmits heat to the coolant from the engine proper 11 the temperature of which has increased due to combustion of the fuel. Accordingly, when the coolant flows through the engine heat exchanger 11a, the temperature of the engine proper 11 decreases, and the temperature of the coolant increases.

In the high-temperature circuit 30 configured as such, when the high-temperature-side pump 33 is driven during operation of the internal combustion engine 10, the coolant is circulated through between the engine heat exchanger 11a and the high-temperature-side radiator 31. As a result, heat is transferred from the engine proper 11 to the coolant in the engine heat exchanger 11a so that the engine proper 11 is cooled, and the coolant the temperature of which has increased is cooled in the high-temperature-side radiator 31.

As illustrated in FIG. 3B, the low-temperature circuit 40 includes a low-temperature-side radiator (a second radiator) 41, a low-temperature-side pump 42, a PCU heat exchanger 21a provided in the PCU 21, and a motor heat exchanger 20a provided in the drive motor 20. In the low-temperature circuit 40, these constituents communicate with each other so that a cooling medium (a coolant in the present embodiment) circulates through the constituents. Note that the low-temperature circuit 40 may include a heat exchanger configured to exchange heat with a heat generation device other than the PCU 21 and the drive motor 20.

Further, the low-temperature-side pump 42, the PCU heat exchanger 21a, and the motor heat exchanger 20a of the low-temperature circuit 40 are provided in the drive assembly 24 (a broken line indicates a part provided in the drive assembly 24). Accordingly, the low-temperature circuit 40 includes low-temperature-side pipes 45, 46 communicating with the low-temperature-side radiator 41 and the drive assembly 24 so that the coolant flows between the low-temperature-side radiator 41 and the drive assembly 24. In the present embodiment, the low-temperature circuit 40 includes two pipes, i.e., a first low-temperature-side pipe 45 and a second low-temperature-side pipe 46. A coolant outlet of the drive assembly 24 communicates with a coolant inlet of the low-temperature-side radiator 41 via the first low-temperature-side pipe 45. A coolant outlet of the low-temperature-side radiator 41 communicates with a coolant inlet of the drive assembly 24 via the second low-temperature-side pipe 46.

The low-temperature-side radiator 41 is placed in the front part of the compartment 110. Accordingly, the low-temperature-side radiator 41 is placed forward of the internal combustion engine 10, the drive motor 20, the PCU 21, and the transaxle 22. Particularly, in the present embodiment, the low-temperature-side radiator 41 is placed right behind the front grille 120 of the vehicle 100. Further, the low-temperature-side radiator 41 is configured similarly to the high-temperature-side radiator 31, for example.

Further, in the present embodiment, the low-temperature-side radiator 41 is placed relatively rearward from the high-temperature-side radiator 31 and relatively downward from the high-temperature-side radiator 31. However, the low-temperature-side radiator 41 may be placed in parallel to the high-temperature-side radiator 31 along the front-rear direction. Even in this case, it is preferable that the low-temperature-side radiator 41 be partially placed downward from the high-temperature-side radiator 31. Alternatively, the low-temperature-side radiator 41 and the high-temperature-side radiator 31 may not deviate from each other in the front-rear direction, and the low-temperature-side radiator 41 and the high-temperature-side radiator 31 may be placed side by side along the up-down direction. In this case, it is preferable that the low-temperature-side radiator 41 be placed above the high-temperature-side radiator 31. Further, in the present embodiment, the high-temperature-side radiator 31 and the low-temperature-side radiator 41 are formed separately but may be formed integrally. In this case, it is preferable that a partition be provided so that respective coolants flowing through the circuits are not mixed.

The low-temperature-side pump 42 pumps the coolant circulating through the low-temperature circuit 40. In the present embodiment, the low-temperature-side pump 42 is an electrically-driven water pump and is configured such that its discharge capacity is changed continuously by adjusting electric power to be supplied to the low-temperature-side pump 42.

The PCU heat exchanger 21a is a heat exchanger configured to exchange heat between the coolant in the low-temperature circuit 40 and the PCU 21. The PCU heat exchanger 21a is formed as a coolant passage provided around constituents of the PCU 21. Further, the motor heat exchanger 20a is a heat exchanger configured to exchange heat between the coolant in the low-temperature circuit 40 and the drive motor 20. The motor heat exchanger 20a is formed as a coolant passage provided around the drive motor 20. The PCU heat exchanger 21a and the motor heat exchanger 20a transmit heat to the coolant from the PCU 21 and the drive motor 20 that generate the heat along with the operation of the drive motor 20.

In the low-temperature circuit 40 configured as such, when the low-temperature-side pump 42 is driven during operation of the internal combustion engine 10, the coolant is circulated from the PCU heat exchanger 21a and the motor heat exchanger 20a to the low-temperature-side radiator 41 and vice versa. As a result, heat is transferred from the PCU 21 to the coolant in the PCU heat exchanger 21a so that the PCU 21 is cooled, heat is transferred from the drive motor 20 to the coolant in the motor heat exchanger 20a so that the drive motor 20 is cooled, and the coolant the temperature of which has increased is cooled in the low-temperature-side radiator 41.

Note that the cooling system may include an air-blow fan in front of or behind the radiators 31, 41 so that air can be sufficiently sent to the radiators 31, 41 even during stop of the vehicle 100 or during slow traveling of the vehicle 100.

In addition, in the present embodiment, the cooling system includes two openable and closable shutters, i.e., a first shutter 51 and a second shutter 52. When the shutters 51, 52 are opened, the shutters 51, 52 permit wind to flow, and when the shutters 51, 52 are closed, the shutters 51, 52 shut off the flow of the wind.

As illustrated in FIG. 2, in the present embodiment, the first shutter 51 extends between a front end part of the undercover 25 and an upper part of the high-temperature-side radiator 31. Accordingly, the first shutter 51 is placed to be inclined downward toward the rear side of the vehicle 100. Further, the first shutter 51 extends between vicinities of both ends of the compartment 110 in the vehicle width direction. Accordingly, the first shutter 51 extends to cross between the two radiators 31, 41, and the internal combustion engine 10 and the drive assembly 24.

Note that the first shutter 51 may not necessarily be placed in the form described above, provided that the first shutter 51 extends from a front end or a top face of the undercover 25 so as to cross between the two radiators 31, 41 and the internal combustion engine 10 and the drive assembly 24. Accordingly, for example, the first shutter 51 may be placed to extend generally vertically (generally perpendicular to the ground) from the top face of the undercover 25 to a bottom face of a bonnet of the vehicle 100.

Further, in the present embodiment, the second shutter 52 extends between the front end of the undercover 25 and a lower end part of the low-temperature-side radiator 41. Accordingly, the second shutter 52 is placed to extend generally horizontally (generally parallel to the ground). Further, the second shutter 52 extends between the vicinities of both ends of the compartment 110 in the vehicle width direction. Accordingly, the second shutter 52 extends to cross an opening provided on the lower side of the compartment 110 and ahead of the undercover 25.

Note that the second shutter 52 may not necessarily be placed in the above form, provided that the second shutter 52 extends between the front end part (a part near the front end) of the undercover 25 and a lower part (a part near a lower end) of the radiators 31, 41. Here, the lower part of the radiators 31, 41 indicates a lower part of an assembly constituted by the two radiators 31, 41. Accordingly, in a case where the high-temperature-side radiator 31 is placed below the low-temperature-side radiator 41, for example, the lower part of the high-temperature-side radiator 31 corresponds to the lower part of the radiators 31, 41.

Figure 4A:
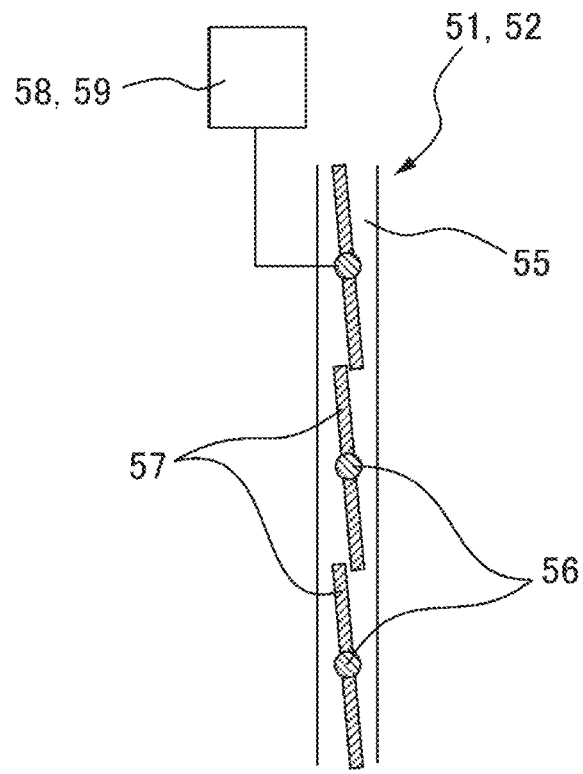
FIG. 4A is a schematic sectional view of a shutter.
Figure 4B:
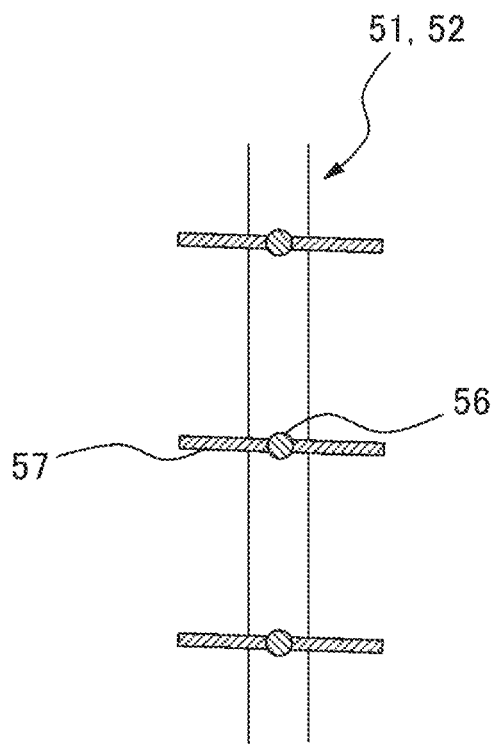
FIG. 4B is a schematic sectional view of the shutter.

FIGS. 4A, 4B are schematic sectional views of part of the shutter 51, 52. FIG. 4A illustrates a state where the shutter 51 is closed, and FIG. 4B illustrates a state where the shutter 51 is opened. As illustrated in FIGS. 4A, 4B, the shutter 51, 52 includes a frame 55, a plurality of rotating shafts 56 turnably connected to the frame 55, respective plates 57 coupled to the rotating shafts 56, and an actuator 58, 59 (a first actuator 58 for the first shutter and a second actuator 59 for the second shutter).

The orientation of the plate 57 changes along with turning of the rotating shaft 56. In the state illustrated in FIG. 4A, each of the plates 57 extends in a direction where the plates 57 are arranged, and as a result, the plates 57 adjacent to each other partially overlap each other. As a result, the shutter 51, 52 is closed. In the meantime, in the state illustrated in FIG. 4B, each of the plates 57 extends in a direction perpendicular to the direction where the plates 57 are arranged, and as a result, the plates 57 are placed in parallel to each other so that the plates 57 do not interfere with each other. As a result, the shutter 51, 52 is opened. The rotating shafts 56 are turned by the actuator 58, 59. Accordingly, the opening and closing of the shutter 51, 52 is controlled by the actuator 58, 59.

Figure 5:
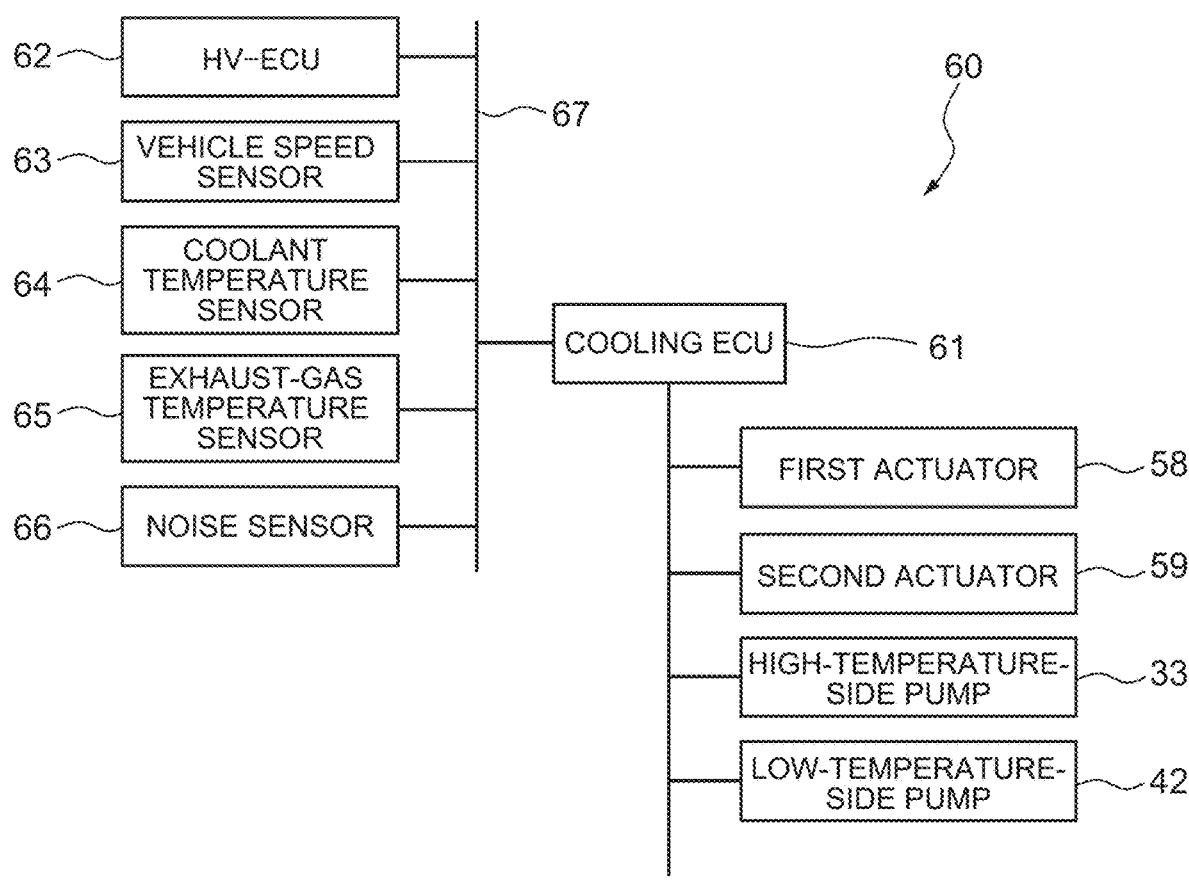
FIG. 5 is a block diagram schematically illustrating a configuration of a control device for the cooling system.

Further, the cooling system includes a control device 60 including a cooling ECU 61. FIG. 5 is a block diagram schematically illustrating a configuration of the control device 60 for the cooling system. The cooling ECU 61 includes a processor configured to perform various calculations, a memory in which programs and various pieces of information are stored, and an interface connected to various actuators and various sensors.

The control device 60 includes an HV-ECU 62, a vehicle speed sensor 63, a coolant temperature sensor 64, an exhaust-gas temperature sensor 65, and a noise sensor 66. The HV-ECU 62 is an ECU configured to control a hybrid system of the vehicle 100. Accordingly, it is possible to acquire, from the HV-ECU 62, information on how the vehicle 100 is currently driven (i.e., by the internal combustion engine 10, by the drive motor 20, or by both of them). The vehicle speed sensor 63 is a sensor configured to detect the speed of the vehicle 100. The coolant temperature sensor 64 is a sensor configured to detect the temperature of the coolant flowing through the high-temperature circuit 30. The exhaust-gas temperature sensor 65 is a sensor configured to detect the temperature of exhaust gas discharged from the internal combustion engine 10. The noise sensor 66 is a sensor configured to detect the degree of noise inside a vehicle cabin. These sensors are communicably connected via an in-vehicle network 67. The in-vehicle network 67 is a network in conformity with a standard such as a controller area network (CAN).

Further, the cooling ECU 61 is connected to the first actuator 58 for the first shutter 51, the second actuator 59 for the second shutter 52, the high-temperature-side pump 33, and the low-temperature-side pump 42 via signal lines. The first actuator 58, the second actuator 59, the high-temperature-side pump 33, and the low-temperature-side pump 42 are controlled in accordance with control signals transmitted from the cooling ECU 61 via the signal lines. Accordingly, the control device 60, particularly the cooling ECU 61, functions as a control device configured to control the opening and closing of the first shutter 51 and the second shutter 52.

Operational States of Shutters

Figure 6:
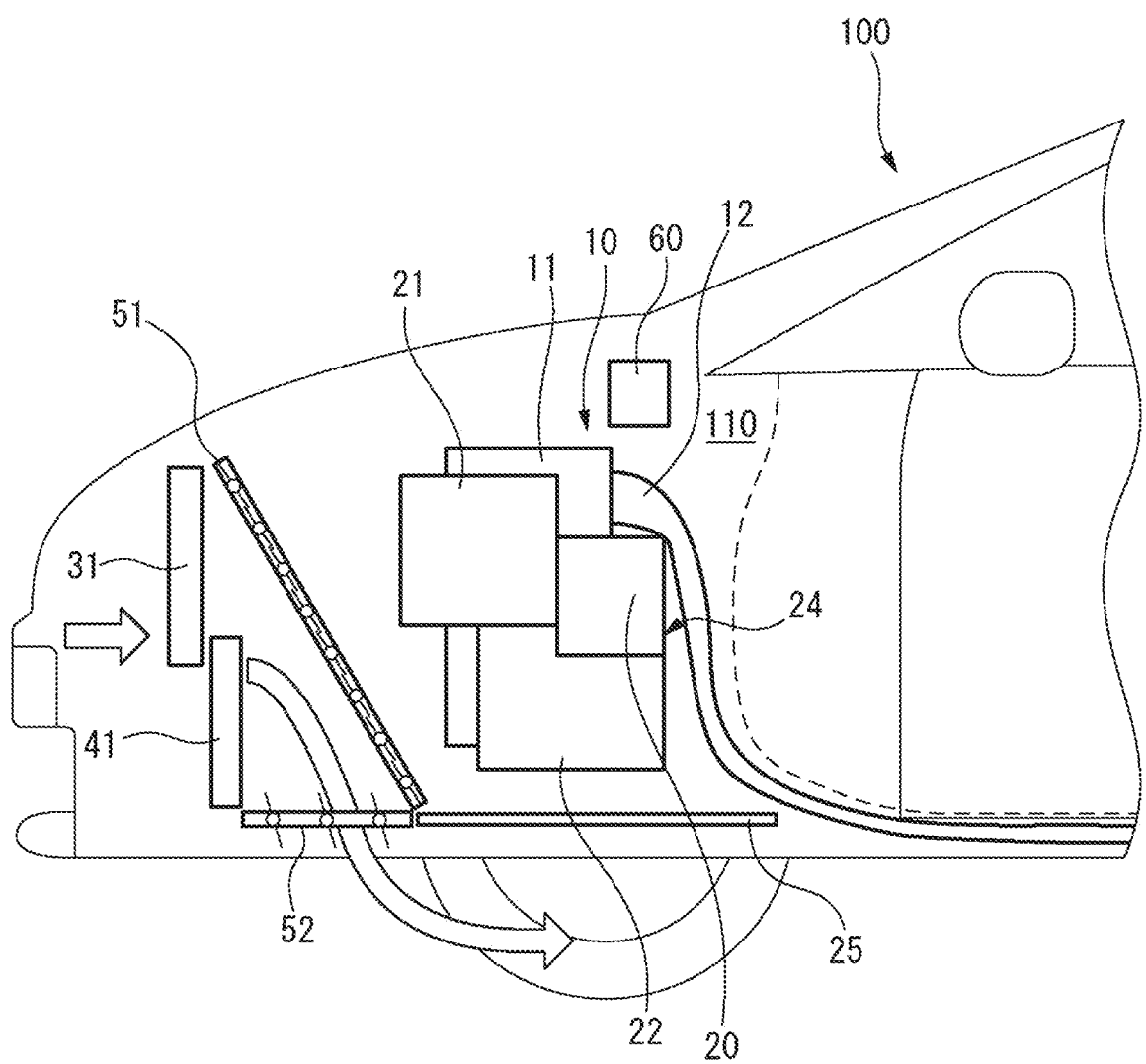
FIG. 6 is a schematic side view illustrating the configuration of the cooling system and so on inside the compartment.
Figure 7:
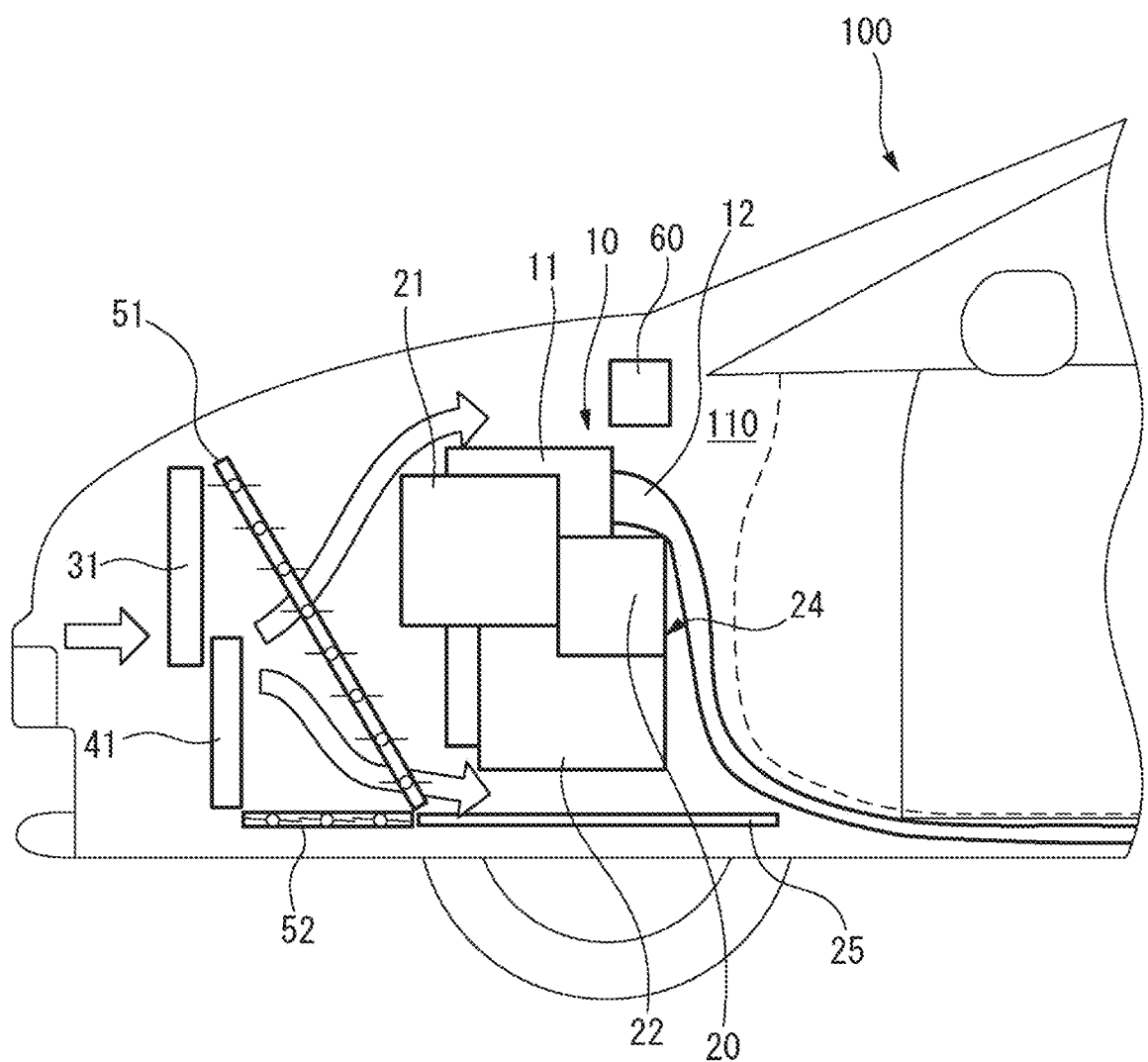
FIG. 7 is a schematic side view illustrating the configuration of the cooling system and so on inside the compartment.
Figure 8:
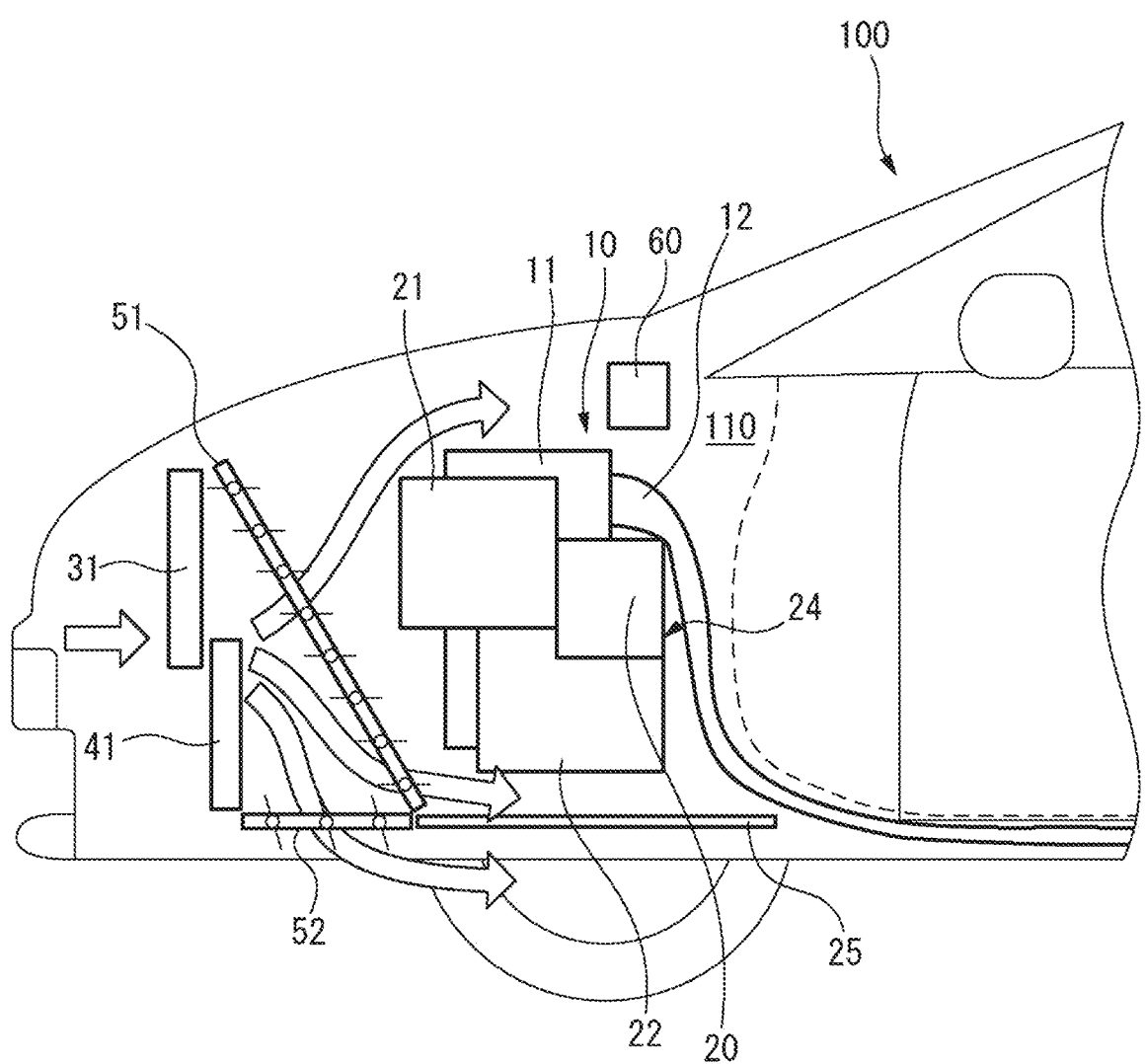
FIG. 8 is a schematic side view illustrating the configuration of the cooling system and so on inside the compartment.

With reference to FIG. 2 and FIGS. 6 to 8, the following describes operational states of the shutters 51, 52 and a relationship with the flow of the wind inside the compartment 110. FIGS. 6 to 8 are schematic side views similar to FIG. 2. FIG. 2 illustrates a state where the shutters 51, 52 are both closed, and FIG. 6 illustrates a state where the first shutter 51 is closed and the second shutter 52 is opened. Similarly, FIG. 7 illustrates a state where the first shutter 51 is opened and the second shutter 52 is closed, and FIG. 8 illustrates a state where the shutters 51, 52 are both opened.

In a case where the shutters 51, 52 are both closed as illustrated in FIG. 2, the wind hitting a front face of the vehicle 100 along with traveling of the vehicle 100 flows through outer sides of the body of the vehicle 100 along a top face of the body or a bottom face of the body without flowing into the compartment 110. Accordingly, the wind does not circulate through the radiators 31, 41, and therefore, the coolants inside the radiators 31, 41 are not cooled. Further, the wind does not flow around the internal combustion engine 10 and the drive assembly 24. Since the wind flows through the surfaces of the body without flowing into the compartment 110, the air resistance received by the vehicle 100 is small. Further, since the second shutter 52 is closed, operating noises of components inside the compartment 110 are hard to leak outside the compartment 110. As a result, it is possible to restrain noise outside and inside the vehicle 100.

In a case where the first shutter 51 is closed and the second shutter 52 is opened as illustrated in FIG. 6, the wind hitting the front face of the vehicle 100 along with traveling of the vehicle 100 flows into the compartment 110 through the radiators 31, 41. Since the first shutter 51 is closed, the wind flowing into the compartment 110 flows toward the lower side of the vehicle 100 through the second shutter 52 that is opened, and after that, the wind flows along the bottom face of the vehicle 100. Accordingly, the wind circulates through the radiators 31, 41, so that the coolants inside the radiators 31, 41 are cooled. In the meantime, the wind does not flow around the internal combustion engine 10 and the drive assembly 24. That is, the wind flows in the compartment 110, but the wind immediately flows out toward the lower side of the vehicle 100 without flowing around the internal combustion engine 10 and the drive assembly 24. Accordingly, the air resistance received by the vehicle 100 is relatively small.

In a case where the first shutter 51 is opened and the second shutter 52 is closed as illustrated in FIG. 7, the wind hitting the front face of the vehicle 100 along with traveling of the vehicle 100 flows into the compartment 110 through the radiators 31, 41. Since the second shutter 52 is closed, the wind flowing into the compartment 110 flows toward the rear side of the compartment 110 through the first shutter 51 that is opened, and after that, the wind flows out the compartment 110 through the lower side of a rear end and so on of the compartment 110. Accordingly, the wind circulates through the radiators 31, 41, so that the coolants inside the radiators 31, 41 are cooled. In addition, the wind flows around the internal combustion engine 10 and the drive assembly 24, and therefore, components at high temperature, particularly the exhaust pipe 12, in the internal combustion engine 10 and the drive assembly 24 are cooled. Further, since the wind flows in around the internal combustion engine 10 and the drive assembly 24 and causes turbulence, the air resistance received by the vehicle 100 is relatively large. In addition, since the second shutter 52 is closed, it is possible to restrain noise outside and inside the vehicle 100.

In a case where the shutters 51, 52 are both opened as illustrated in FIG. 8, the wind hitting the front face of the vehicle 100 along with traveling of the vehicle 100 flows into the compartment 110 through the radiators 31, 41. Since the shutters 51, 52 are both opened, the wind flowing into the compartment 110 flows toward the rear side of the compartment 110 through the first shutter 51 and also flows toward the lower side of the vehicle 100 via the second shutter 52. Accordingly, in this case, a large quantity of wind circulates through the radiators 31, 41, so that the coolants inside the radiators 31, 41 are easily cooled. Further, since the wind flows around the internal combustion engine 10 and the drive assembly 24, components at high temperature, particularly the exhaust pipe 12, in the internal combustion engine 10 and the drive assembly 24 are cooled. In addition, since the wind flows in around the internal combustion engine 10 and the drive assembly 24 and causes turbulence, the air resistance received by the vehicle 100 is relatively large.

Thus, with the cooling system of the present embodiment, by controlling the opening and closing of the first shutter 51 and the second shutter 52, the wind can flow through the radiators 31, 41, the internal combustion engine 10, and the drive assembly 24 in various forms. Accordingly, it is possible to appropriately control the temperature of the heat generation devices that generate heat along with the operation of the internal combustion engine 10 and the drive motor 20.

Further, in the present embodiment, the low-temperature-side radiator 41 is at least partially placed downward from the high-temperature-side radiator 31. As a result, even when the first shutter 51 is closed and the wind flows mainly through the lower part of the radiators 31, 41 as illustrated in FIG. 6, much wind flows through the low-temperature-side radiator 41. Accordingly, the coolant inside the low-temperature circuit 40 can be cooled sufficiently in such a case.

Control on Shutters

Figure 9:
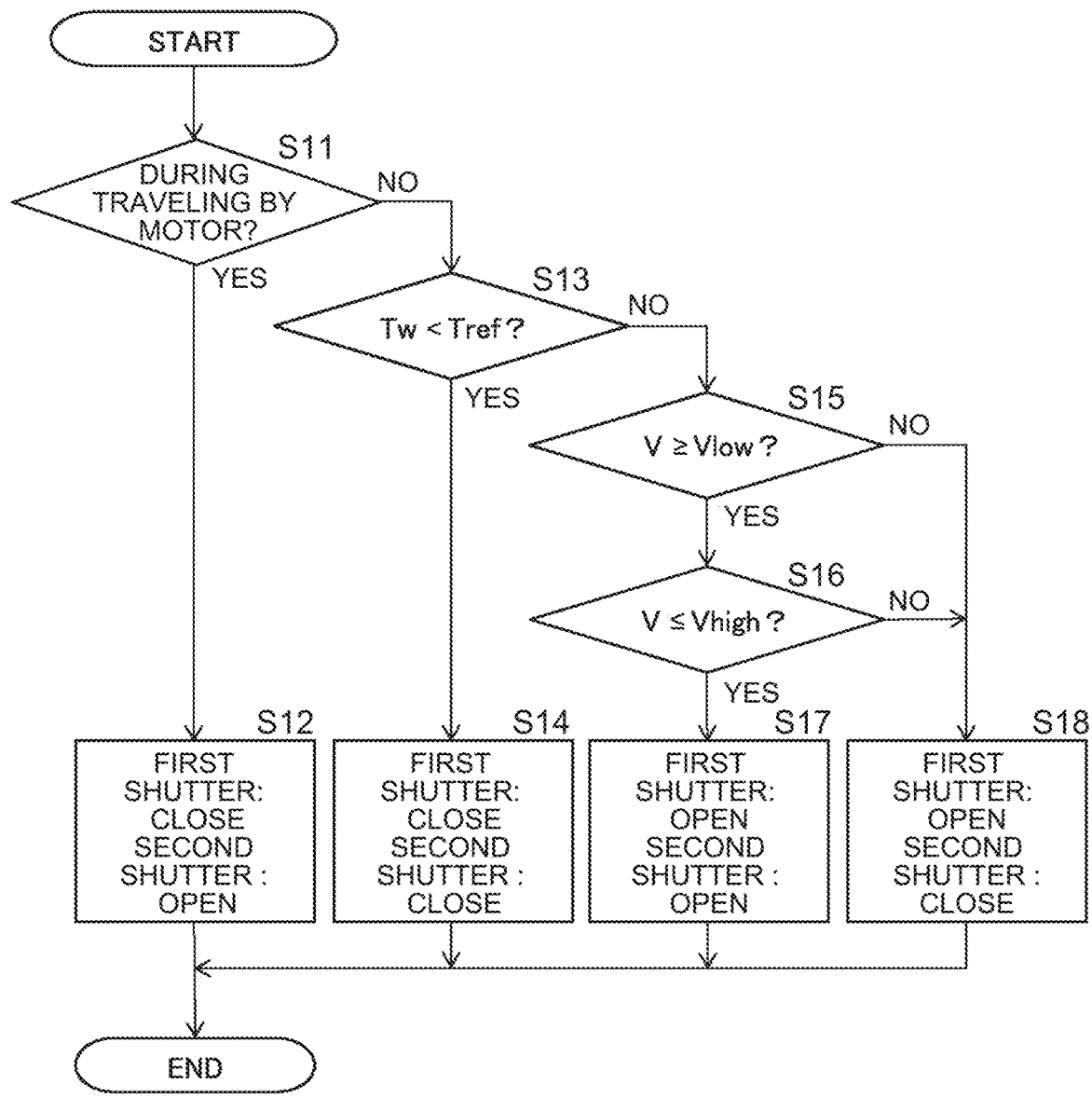
FIG. 9 is a flowchart of an open-close control process of the shutter.

With reference to FIG. 9, the following describes an open-close control on the shutters 51, 52. FIG. 9 is a flowchart of an open-close control process of the shutters 51, 52. The process illustrated in FIG. 9 is executed by a processor of the cooling ECU 61 at predetermined time intervals.

First, the cooling ECU 61 determines whether or not the vehicle 100 is driven only by the drive motor 20 without being driven by the internal combustion engine 10 (step S11). As described above, it is possible to acquire, from the HV-ECU 62, information on how the vehicle 100 is currently driven (i.e., by the internal combustion engine 10, by the drive motor 20, or by both of them). Accordingly, based on the information thus acquired from the HV-ECU 62, the cooling ECU 61 determines whether the vehicle 100 is driven only by the drive motor 20 or not.

When the cooling ECU 61 determines, in step S11, that the vehicle 100 is driven only by the drive motor 20, the cooling ECU 61 controls the first actuator 58 such that the first shutter 51 is closed and also controls the second actuator 59 such that the second shutter 52 is opened (step S12). As a result, the cooling system is brought into the state illustrated in FIG. 6. Accordingly, the wind flows into the low-temperature-side radiator 41, so that cooling of the heat generation devices that generate heat along with the operation of the drive motor 20 is achieved, and the air resistance received by the vehicle 100 can be restrained to be small.

When the cooling ECU 61 determines, in step S11, that the vehicle 100 is not driven only by the drive motor 20, that is, when the cooling ECU 61 determines that the vehicle 100 is driven by the internal combustion engine 10, the cooling ECU 61 determines whether or not a temperature Tw of the coolant of the high-temperature circuit 30 is less than a warming-up reference temperature Tref (step S13). The temperature Tw of the coolant is detected by the coolant temperature sensor 64. Further, the warming-up reference temperature Tref is a temperature that the temperature of the coolant reaches when warming-up of the internal combustion engine 10 is completed. The warming-up reference temperature Tref is 80° C., for example. Accordingly, in other words, the cooling ECU 61 determines whether or not the internal combustion engine 10 is during warming-up in step S13.

Note that, in the present embodiment, based on the temperature of the coolant of the high-temperature circuit 30, the cooling ECU 61 determines whether or not the internal combustion engine 10 is during warming-up. However, the cooling ECU 61 may determine, by other methods, whether or not the internal combustion engine 10 is during warming-up. Accordingly, for example, the cooling ECU 61 may determine, based on the temperature of lubricant in the internal combustion engine 10, whether or not the internal combustion engine 10 is during warming-up.

When the cooling ECU 61 determines, in step S13, that the temperature Tw of the coolant of the high-temperature circuit 30 is less than the warming-up reference temperature Tref, that is, when the cooling ECU 61 determines that the internal combustion engine 10 is during warming-up, the cooling ECU 61 controls the first actuator 58 and the second actuator 59 such that the first shutter 51 and the second shutter 52 are both closed (step S14). As a result, the cooling system is brought into the state illustrated in FIG. 2. Accordingly, while noise outside and inside the vehicle 100 is restrained to be small, the air resistance received by the vehicle 100 can be restrained to be small.

When the cooling ECU 61 determines, in step S13, that the temperature Tw of the coolant of the high-temperature circuit 30 is the warming-up reference temperature Tref or more, that is, when the cooling ECU 61 determines that the warming-up of the internal combustion engine 10 is completed, the cooling ECU 61 determines whether or not a speed V of the vehicle 100 is a low reference speed Vlow or more (step S15), and the cooling ECU 61 determines whether or not the speed V of the vehicle 100 is a high reference speed Vhigh or less (step S16). The speed V of the vehicle 100 is detected by the vehicle speed sensor 63.

Further, the low reference speed Vlow is a speed defined such that, when the speed of the vehicle 100 is lower than the low reference speed Vlow, traveling noise (noise caused by components other than actuating parts such as the internal combustion engine 10 and the drive assembly 24 in the compartment 110) of the vehicle 100 reaches a predetermined value or less. Accordingly, in other words, in step S15, the cooling ECU 61 determines whether or not traveling noise of the vehicle 100 is the predetermined value or less or whether or not traveling noise of the vehicle 100 is expected to become the predetermined value or less. Note that, the cooling ECU 61 may determine whether or not traveling noise of the vehicle 100 is the predetermined value or less, or the like, based on a factor other than the speed V of the vehicle 100. Accordingly, the cooling ECU 61 may determine whether or not traveling noise of the vehicle 100 is the predetermined value or less, or the like, based on a noise sensor provided inside the vehicle cabin, for example.

Further, the high reference speed Vhigh is a speed defined such that, when the speed of the vehicle 100 is higher than the high reference speed Vhigh, the temperature of the exhaust gas rises, and the temperature of the exhaust pipe 12 inside the compartment 110 reaches a predetermined value or more. Accordingly, in other words, in step S16, the cooling ECU 61 determines whether or not the temperature of the exhaust pipe 12 is the predetermined value or more or whether or not the temperature of the exhaust pipe 12 is expected to become the predetermined value or more. Note that, the cooling ECU 61 may determine whether or not the temperature of the exhaust pipe 12 is the predetermined value or more, or the like, based on a factor other than the speed V of the vehicle 100. Accordingly, the cooling ECU 61 may determine whether or not the temperature of the exhaust pipe 12 is the predetermined value or more, or the like, based on a load of the internal combustion engine 10 or an output from a temperature sensor provided in the exhaust pipe 12, for example.

When the cooling ECU 61 determines, in step S15, that the speed V of the vehicle 100 is the low reference speed Vlow or more and determines, in step S16, that the speed V of the vehicle 100 is the high reference speed Vhigh or less, the cooling ECU 61 controls the first actuator 58 and the second actuator 59 such that the first shutter 51 and the second shutter 52 are both opened (step S17). As a result, the cooling system is brought into the state illustrated in FIG. 8. Accordingly, a large quantity of wind flows into the radiators 31, 41, so that the coolants inside the radiators 31, 41 are cooled quickly.

In the meantime, when the cooling ECU 61 determines, in step S15, that the speed V of the vehicle 100 is less than the low reference speed Vlow or the cooling ECU 61 determines, in step S16, that the speed V of the vehicle 100 is higher than the high reference speed Vhigh, the cooling ECU 61 controls the first actuator 58 such that the first shutter 51 is opened and also controls the second actuator 59 such that the second shutter 52 is closed (step S18). As a result, the cooling system is brought into the state illustrated in FIG. 7. Accordingly, when traveling noise of the vehicle 100 is the predetermined value or less, it is possible to restrain noise from leaking out the compartment 110. In addition, when the temperature of the exhaust pipe 12 is high, the exhaust pipe 12 can be cooled.

Note that, as can be seen from S17, S18, in the present embodiment, when the hybrid vehicle is driven by the internal combustion engine 10 except a case where the internal combustion engine 10 is during warming-up, the first shutter 51 is opened. Accordingly, basically, the wind can be introduced in around the engine proper 11 and the exhaust pipe 12, thereby making it possible to cool the engine proper 11 and the exhaust pipe 12.

The embodiment of the present disclosure has been described above, but the present disclosure is not limited to the embodiment, and various modifications and alterations can be made within the scope of Claims.

What is claimed is:

1. A cooling system for a hybrid vehicle driven by an internal combustion engine and a drive motor, the cooling system comprising:
 a radiator placed forward of the internal combustion engine and a heat generation device configured to generate heat along with operation of the drive motor, the radiator communicating with the heat generation device and the internal combustion engine such that a coolant circulates through the internal combustion engine and the heat generation device;
 a first shutter provided in an openable and closable manner such that the first shutter extends from a front end or a top face of an undercover so as to cross between the radiator, and the heat generation device and the internal combustion engine, the undercover being provided below the internal combustion engine and the heat generation device, the undercover being configured to partially cover a bottom face of the hybrid vehicle;
a second shutter provided in an openable and closable manner such that the second shutter extends between a front end part of the undercover and a lower part of the radiator; and
a control device configured to control opening and closing of the first shutter and the second shutter.

2. The cooling system according to claim 1, wherein the radiator includes a first radiator communicating with the internal combustion engine, and a second radiator communicating with the heat generation device.

3. The cooling system according to claim 2, wherein the second radiator is formed separately from the first radiator and is at least partially placed downward from the first radiator.

4. The cooling system according to claim 1, wherein, when the hybrid vehicle is driven by the drive motor without being driven by the internal combustion engine, the control device closes the first shutter and opens the second shutter.

5. The cooling system according to claim 1, wherein, when the hybrid vehicle is driven by the internal combustion engine, the control device opens the first shutter.

6. The cooling system according to claim 5, wherein, even in a case where the hybrid vehicle is driven by the internal combustion engine, when the internal combustion engine is during warming-up, the control device closes the first shutter.

7. The cooling system according to claim 5, wherein, when traveling noise of the hybrid vehicle is a predetermined value or less or is expected to become the predetermined value or less, or when a temperature of an exhaust pipe of the internal combustion engine is a predetermined temperature or more or is expected to become the predetermined temperature or more, the control device closes the second shutter.

* * * * *